L. H. VAN BRIGGLE.
SHOCK ABSORBER.
APPLICATION FILED OCT. 25, 1919.
1,328,641.
Patented Jan. 20, 1920.
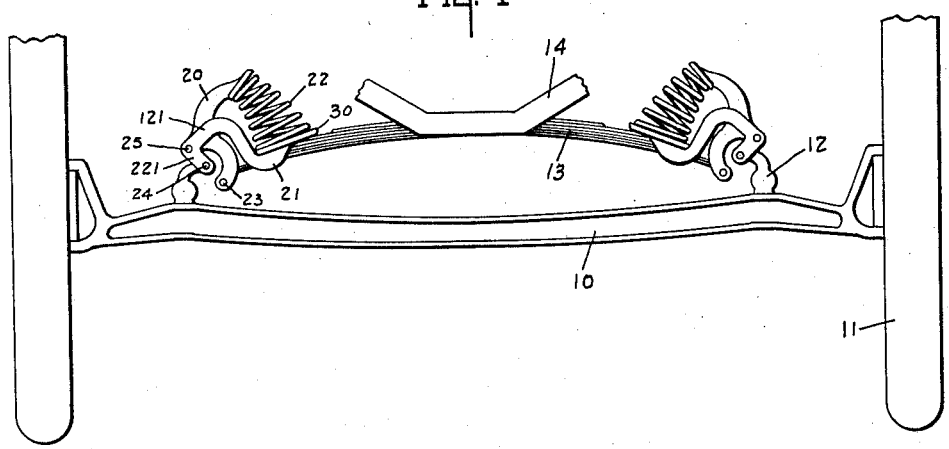
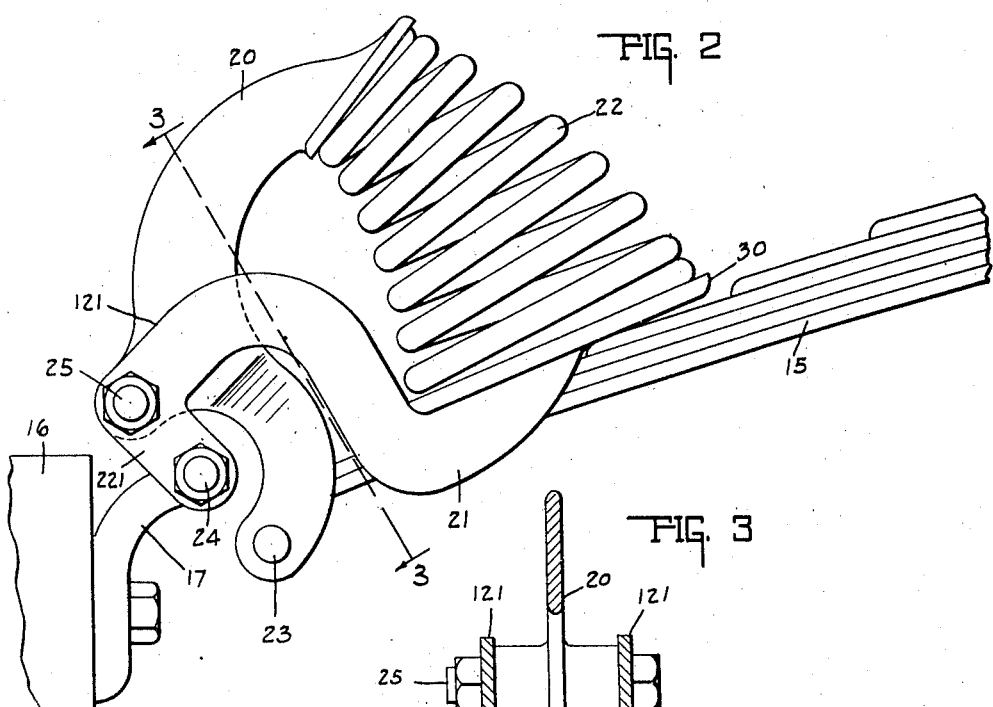
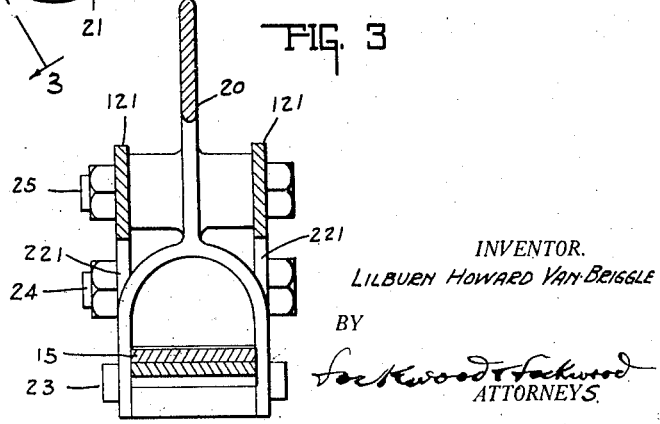
INVENTOR.
LILBURN HOWARD VAN-BRIGGLE
BY
Lockwood & Lockwood
ATTORNEYS.

UNITED STATES PATENT OFFICE.

LILBURN HOWARD VAN BRIGGLE, OF INDIANAPOLIS, INDIANA.

SHOCK-ABSORBER.

1,328,641.  Specification of Letters Patent.  Patented Jan. 20, 1920.

Application filed October 25, 1919. Serial No. 333,389.

*To all whom it may concern:*

Be it known that I, LILBURN HOWARD VAN BRIGGLE, a citizen of the United States, and a resident of Indianapolis, county of Marion, and State of Indiana, have invented a certain new and useful Shock-Absorber; and I do hereby declare that the following is a full, clear, and exact description thereof, reference being had to the accompanying drawings, in which like numerals refer to like parts.

The object of this invention is to improve the construction and operation of shock absorbers adapted particularly for use in connection with Ford automobiles and especially those with inturned perches.

The chief feature of the invention consists in simplifying the construction by employing a very small number of parts, and also making the action of the shock absorber positive and uniform by reason of the fewness of the parts and their rigidity. To that end the shock absorber includes only two parts besides the auxiliary spring and each of said parts is a rigid member. One of said parts is the shock absorber lever which carries the end of the main spring and the other part is the member which is pivoted to the perch and to which the shock absorber lever is mounted and which at its inner end rides upon the main spring. Between the inner ends of these two parts an auxiliary spring is mounted for yieldingly resisting the action of the shock absorber lever. Therefore, this shock absorber has not shackles, as understood in this art, and no shackles are used in connection with it. The shackles coming with the Ford automobile are removed when the shock absorbers are mounted.

The full nature of the invention will be understood from the accompanying drawings and the following description and claims.

In the drawings, Figure 1 is an elevation of the front end of a portion of a Ford automobile equipped with said new shock absorbers, parts being broken away. Fig. 2 is an elevation of a portion of the rear of the automobile, on a larger scale showing one of said shock absorbers and its mounting. Fig. 3 is a section on the line 3—3 of Fig. 2.

There is shown in Fig. 1 the front axle 10 of a Ford automobile carried by the front wheels 11, and said axle has the rigid inturned perches 12, which as the automobile is sold by the manufacturer, supports the front main spring 13 by shackles not shown. 14 is a part of the frame body of the automobile carried by said spring. The ends of said main spring 13 are supported by said new shock absorbers, the construction and operation of which will be explained later.

In Fig. 2 there is shown the rear main spring 15 of a Ford automobile and a portion of a brake housing 16 with a perch 17 secured thereto, said rear spring 15 is supported by said shock absorbers arranged in the same manner as the front main spring.

This shock absorber consists essentially of a shock absorber lever 20, lever supporting member 21 and an auxiliary spring 22.

The shock absorber lever is or may be of a usual type and at its lower end is in pivotal connection with the end of the main spring by a pin 23. The member 21 has its outer portion 121 bifurcated and the arms thereof extending astride the lever 20 and the outer end of each arm 121 of said member 21 has a downwardly and inwardly extending portion 221, substantially the same in form and position as shackles in similar shock absorber constructions heretofore used. The members 221 are pivoted at their lower ends by a bolt 24 to the upper end of the perch, and at the upper ends of said members 221 and at the outer ends of the arms 121 of member 21 the shock absorber lever is fulcrumed, substantially between its ends, by a bolt 25.

The inner portion of member 21 is also bifurcated and extends down astride the main spring and at its inner end is secured rigidly to a circular plate 30, which carries the lower end of the auxiliary spring 22. Said spring 22 is located between the inner ends of said lever 20 and member 21 and furnishes yielding resistance to the vibrations of the upper inner end of said lever. The spring supporting plate 30 rests on or is supported by the main spring. The member 21, therefore, as a whole, includes the plate 30, arms 121 and pivotal parts 221, all of said parts being integral and formed into a rigid unit.

In operation under the influence of a load the main spring 15 will be forced downward and laterally which will cause the inner end of the member 21 to descend and turn on its pivot 24, tending to move the pivotal parts 21 thereof more and more toward the vertical position as the load increases. In such movement as the spring 15 tends to move laterally outward and straighten under strain, the plate 30 on the inner end of the member 21 moves inward on said spring. The downward and outward movement of the end of the main spring under load tends to force the upper inner end inward and downward against the auxiliary spring, and also the turning movement of the member 21 on its fulcrum 24 under load, causes the fulcrum of the lever 20 to move inward at the same time as said lever is influenced by the movement of the inner end of the main spring. This augments the inner and downward movement of the lever 20, and such movement is yieldingly resisted by the auxiliary spring. As the load is reduced, the springs 15 and 22 return the associated parts to their normal position, substantially as shown in the drawings, which represent the positions of the parts when the main springs are supporting only the body of the vehicle and not an added load.

It is observed, therefore, that this shock absorber consists of very few parts, essentially three parts, and the absence of shackles makes these parts work positively, resulting in an extremely simple, effective and satisfactory shock absorber.

The invention claimed is:

1. The combination with the main spring of an automobile and a perch located near each end thereof, of a shock absorber for supporting each end of said main spring on its adjacent perch, said shock absorber including a rigid member fulcrumed at its outer end to the perch and projecting inward along the main spring and at its inner end supported thereby, a lever pivotally supporting at its lower end the end of the main spring and fulcrumed substantially between its ends to said member above the perch, and an auxiliary spring between the inner ends of said member and lever, substantially as set forth.

2. A shock absorber for supporting the end of the main spring of an automobile on a perch of the automobile, including a rigid member fulcrumed at its outer end to the perch and projecting inward along the main spring and at its inner end supported thereby, a lever pivotally supporting at its lower end the end of the main spring and fulcrumed substantially between its ends to said member above the perch, and an auxiliary spring between the inner ends of said member and lever, substantially as set forth.

3. A shock absorber for supporting the end of the main spring of an automobile on a perch of the automobile, including a rigid member with its outer ends bifurcated and turned downward and fulcrumed on the perch and the inner end of said member being bifurcated so as to lie astride the main spring with an auxiliary spring supporting plate located on its inner end and supported by said main spring, a shock absorber lever extending between the bifurcated outer ends of said member and with the lower end of said lever in pivotal connection with the end of the main spring, and said lever being fulcrumed between its ends to the outermost portion of said member, and a spiral spring resting upon the plate upon the inner end of said member and supporting the upper end of said lever, substantially as set forth.

4. A shock absorber for supporting the end of the main spring of an automobile on a perch of the automobile, including a member extending substantially parallel with the main spring and with the inner end thereof supported by the main spring and with the outer end of said member extending to a point above the perch and tongues extending downward and at the lower end of said extension fulcrumed on said perch, a shock absorber lever fulcrumed substantially between its ends to the outermost part of said member and above the perch and having a lower end that is in pivotal connection with the end of said main spring, a spiral spring supported by the inner end of said member and supporting the upper inner end of said lever, the parts being arranged so that a downward movement of the main spring will cause said member which carries said lever and auxiliary spring to turn correspondingly on its fulcrum in the perch and cause the upper end of said lever to move inward as its lower end is forced outward by the main spring.

In witness whereof, I have hereunto affixed my signature in the presence of the witnesses herein named.

LILBURN HOWARD VAN BRIGGLE.

Witnesses:
 GEORGE W. RANK,
 C. A. TAYLOR.